United States Patent [19]

Drawe

[11] 3,739,867
[45] June 19, 1973

[54] SNOWMOBILE
[75] Inventor: John W. Drawe, Romulus, Mich.
[73] Assignee: Leisure Vehicles, Inc., Romulus, Mich.
[22] Filed: June 10, 1971
[21] Appl. No.: 151,809

[52] U.S. Cl. .................................. 180/5 R, 305/24
[51] Int. Cl. ............................................ B62m 27/02
[58] Field of Search .................... 180/5 R, 5 A, 9.5, 180/6.5; 305/27, 35 EB

[56] References Cited
UNITED STATES PATENTS
| | | | |
|---|---|---|---|
| 2,074,389 | 3/1937 | Grant | 180/5 A |
| 1,188,981 | 6/1916 | Muscott | 180/5 A |
| 3,136,378 | 6/1964 | Patee | 180/9.5 X |
| 3,485,312 | 12/1969 | Swenson | 180/5 R |
| 3,637,035 | 1/1972 | Washburn | 180/5 R |
| 3,199,620 | 8/1965 | Wheeler | 305/35 EB X |
| 3,369,624 | 2/1968 | Kauffman | 180/5 R X |
| 3,623,563 | 11/1971 | Gosfomski | 180/5 R |

FOREIGN PATENTS OR APPLICATIONS
458,391  8/1913  France ................ 180/5 A Primary Examiner—Richard J. Johnson
Attorney—Cullen, Settle, Sloman & Cantor

[57] ABSTRACT

A snowmobile comprises a pair of steerable front skis and a pair of laterally spaced rear driving tracks. The engine and seat are located between and below the level of the top of the tracks. Each track encompasses a driving wheel and a front and rear ground or bogie wheel. The front bogie wheels are mounted to normally maintain a higher elevation than the rear bogie wheels, so that the forward portion of each track is normally spaced above ground level. Another embodiment places the normal position of both front and rear bogie wheels above the ground, with only an intermediate point of ground contact.

2 Claims, 7 Drawing Figures

PATENTED JUN 19 1973

INVENTOR.
JOHN W. DRAWE.
BY
CULLEN, SETTLE, SLOMAN & CANTOR.

ATT'YS.

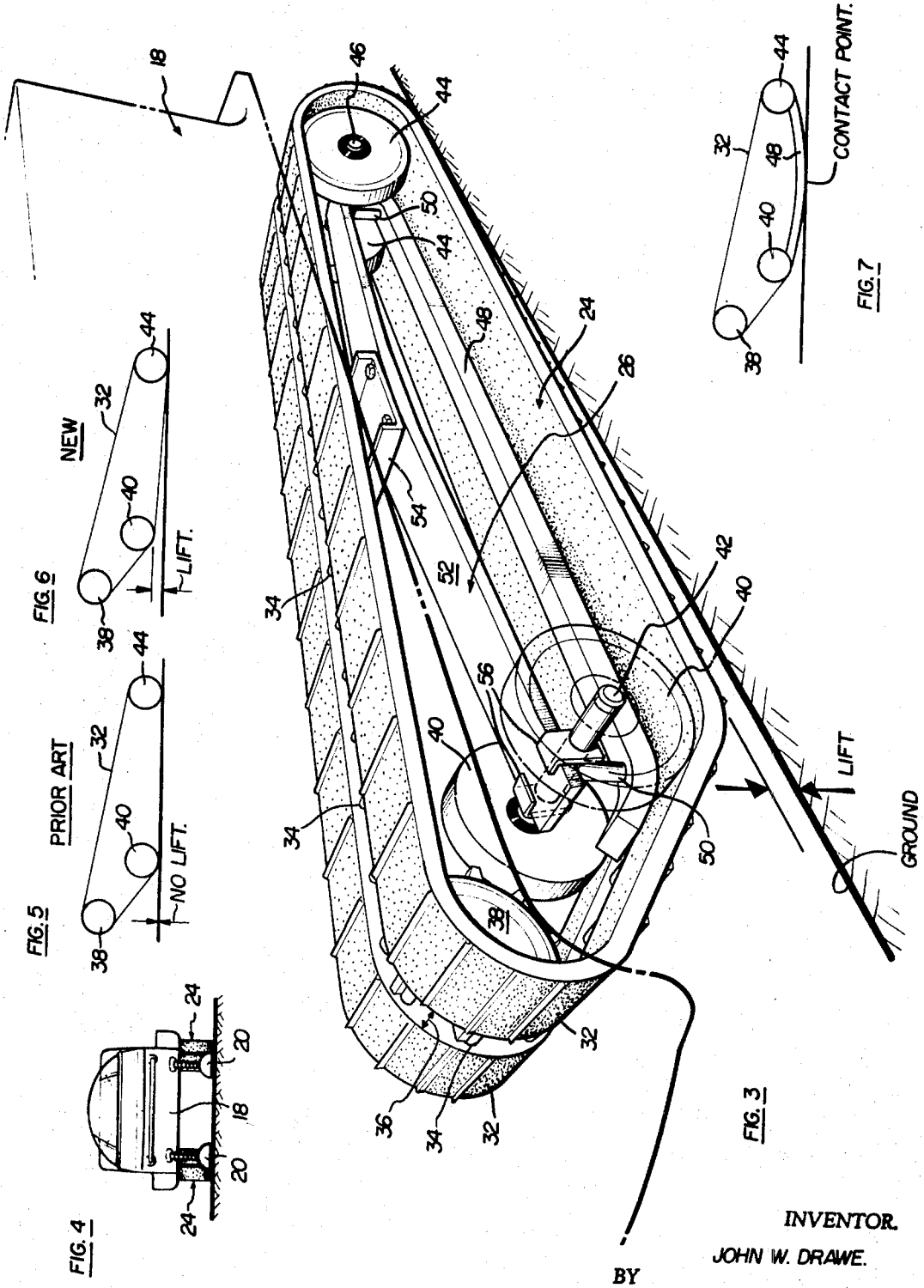

3,739,867

SNOWMOBILE

BACKGROUND OF INVENTION

There are several types of tracked recreational and similar all-purpose vehicles. One type is the "all-terrain" or "go-anywhere" vehicle, having widely spaced double tracks driven through a differential. These vehicles are steered by braking one track, and may be provided with front skis. They are generally relatively large vehicles.

A second type is provided with a single wide track plus one or more steerable front skis. Typical of this type is the small recreational snowmobile. A third type is similar to the above described snowmobile, but differs only in that a pair of closely spaced side-by-side tracks are provided rather than a single wide track.

Experience has shown that effective steering of the second and third types of vehicles described above, the snowmobile type, requires a considerable amount of skill. Particularly where sharp turns are desired, it is necessary for the driver to shift his weight substantially by leaning far out toward the inside of the turn while holding tightly to the handlebars with both hands. This shift in weight establishes a conical or bowl shaped surface in the snow, upon which the vehicle is then able to negotiate a radius, much as a wheeled vehicle negotiates a high speed type turn on a banked road surface. This method has proven necessary because of the high lateral resistance of the relatively long track surface contacting the ground, which surface resists yaw of the vehicle.

This weight-shifting technique required for effective steering requires a relatively high center of gravity, generally requiring that the driver rise from the seated position to a semi-crouch, much in the manner of a skier negotating a turn.

This steering technique not only requires a considerable amount of skill, but it may also result in tipping the vehicle over, causing injury to the driver or passenger and damage to the vehicle. The instability of the vehicle is increased, because the manufacturers often intentionally increase the height of the seat and engine to reduce the amount of weight shifting required. This relatively high center of gravity makes it extremely difficult to maintain a straight line on a sloped terrain.

Hence, it is the primary objective of this invention to provide a snowmobile with improved steering ability so as to eliminate the need for the difficult and unsafe leaning technique described above, and further permitting the lowering of the center of gravity of the vehicle.

BRIEF DESCRIPTION OF THE DRAWINGS

FIG. 3 is a perspective of the rear track and suspension portion of the vehicle, partially in phantom.

FIG. 4 is a front view of the snowmobile of FIG. 1.

FIG. 5 is a schematic side view of the prior art track geometry.

FIG. 6 is a view similar to FIG. 5, but showing one version of the improved track geometry of the present invention.

FIG. 7 is a view similar to FIG. 6, but showing an alternate improved track geometry.

DETAILED DESCRIPTION OF THE DISCLOSURE

Figure 1:
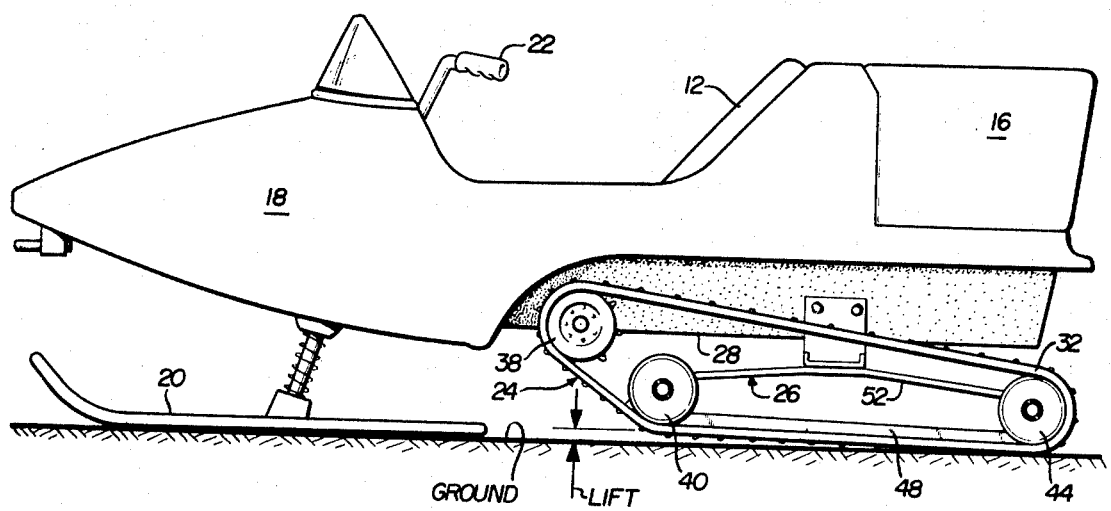
FIG. 1 is a side view of a snowmobile incorporating the improved steering and lowered center of gravity features of this invention.
Figure 2:
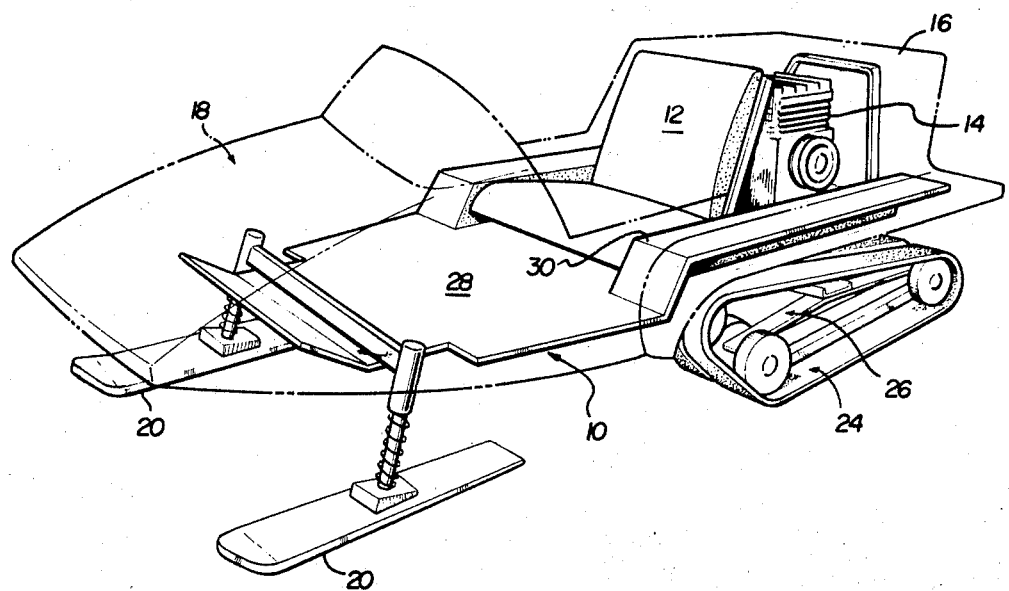
FIG. 2 is a perspective of the snowmobile of FIG. 1, showing the body in phantom.

Referring to FIGS. 1 and 2, in particular of the drawing, the snowmobile of this invention generally comprises a floor pan or chassis assembly 10, seat 12, and engine 14 located immediately behind the seat and provided with a cover 16, and an enclosing body 18. The vehicle is supported by a pair of steerable front skis 20 controlled by handlebars 22 and a pair of laterally spaced rear track assemblies 24 connected to the chassis 10 by rear suspension assembly 26. As best shown in FIG. 2, floor pan or chassis assembly 10 includes a lower central floor pan portion 28 upon which the seat 12 and engine 14 are mounted, and a pair of raised track-clearing side floor pan portions 30. Thus, as is evident from FIGS. 1 and 2, the seat and engine are located between and partially below the level of the top of rear track assemblies 24.

Referring to FIG. 3 of the drawings, wherein rear track assembly 24 and rear suspension assembly 26 are shown in greater detail, it will be seen that each of the rear track assemblies 24 comprises a pair of laterally spaced flexible belts 32 interconnected by spaced cross-bars 34 which bridge gap 36 between the two belts. Gap 36 and cross-bars 34 cooperate in the conventional fashion with the teeth of driving sprocket wheel 38 which is in turn connected to the output shaft of engine 14 by conventional means not illustrated.

Each belt 32 also encompasses a front ground or bogie wheel 40 rotatably mounted on front axle 42 and a rear ground or bogie wheel 44 rotatably mounted on rear axle 46.

A slide rail 48 is dimensioned and contoured to fit into the gap or slot 36 between the lower portion of flexible belts 32 of each track assembly 24. Slide rails 48 are preferably fabricated of a low friction high wear resistant material, such as a polyester resin. The belt connecting cross-bars 34 thus ride on the lower surface of slide rail 48, and the rail functions to limit the lateral shifting of the belts relative to the driving and bogie wheels.

Slide rail 48 also interconnects and fixes the relative location of front and rear bogie wheel axles 42 and 46. As is shown in FIG. 3, both axles are rigidly connected to slide rail 48 by brackets generally shown at 50. To provide belt tensioning adjustment, rear axle 46 may be adjustably connected to slide rail 48 by a bracket which is slotted to permit axle 46 to be adjusted in the fore and aft direction. Such an adjustment can be made by a variety of means not within the scope of this invention, and is hence not illustrated.

Bogie wheels 40 and 44 are mounted to chassis 10 through a rear leaf spring 52 which is connected to the chassis by a centrally mounted bracket 54.

The front of the leaf spring 52 is loosely connected to front bogie wheel axle 46 by a pair of retaining guides 56, mounted on axle 42. Guides 56 are L-shaped so as to loosely straddle the front end of leaf spring 52, and thereby loosely retain it between the upwardly directed legs of guides 56 and axle 42. Thus, the front of leaf spring 52 is free to slide fore and aft relative to axle 42 while being restrained in the upward and lateral directions.

The rear end of leaf spring 52 may be looped to form an eye around rear axle 46, or may be otherwise connected in a non-adjustable fashion by means not forming a portion of this invention.

The above means for interconnecting leaf spring 52 with the front and rear bogie wheel axles 42 and 46 thus enable the leaf spring to flex under the varying suspension loads, while still accommodating the fixed center-to-center distance between the two axles.

The essential aspect of the improved snowmobile of the invention which permits the steering to be simplified and the center of gravity to be lowered is the relative elevation of the front and rear bogie wheels and the location and size of the ground-contacting portion of the tracks. As shown in FIGS. 1 and 3, the front bogie wheel 40 and adjacent portions of the track are elevated above ground level, so that only the rear portion of each track is normally in contact with the ground. Thus, the lower portion of the tracks are downwardly and rearwardly inclined between the front and rear bogie wheels, rather than being horizontal.

FIG. 5 shows the conventional prior art configuration wherein both front and rear bogie wheels are at the same elevation, so that the full length of the portion of the track between these bogie wheels is in contact with the ground. Hence, in the prior art arrangement, there was no lift or elevation of the front bogie wheel and adjacent track portions relative to the ground level. In contrast, FIG. 6 shows the configuration of one embodiment of the present invention, wherein the front bogie wheel and adjoining portions of the track are lifted or elevated above the level of the rear bogie wheel, so that only the rear portion of the track contacts the ground.

This difference in elevation of the front and rear bogie wheels is accomplished by appropriate selection of the dimensions and spring rate characteristics of leaf spring 52, where in the static condition of the vehicle on the ground, the normal rise of the front portion of the track is one-half to three-quarters of an inch, by way of example. Even with the addition of a passenger's weight, the spring rate is such that the upward flexing of the rear wheel is not so great as to raise it to the elevation of the front wheel. The raised position of the front bogie wheel is also in part a result of the tension of the track from the driving wheel 38.

The improved steering characteristics produced by this rear track geometry appear to be a result of the change in weight distribution. The difference in elevation between the front and rear bogie wheels causes a greater portion of the weight of the vehicle to be supported by rear bogie wheel 44 than is supported by front bogie wheel 40. Thus, when the front skis 20 are turned, the rear portion of the vehicle can, in effect, pivot about the rear end of the track. While heretofore it was necessary for the full length of the track between the front and rear wheels to be forced to yaw laterally, this is no longer necessary in the improved rear track configuration of the present invention. The lever arm from the front ski to the effective ground contacting point at the rear of the vehicle is thus increased, making this front ski more effective in turning the vehicle. The effectiveness of the front ski is also increased since a greater portion of the vehicle's weight is on the front skis, since removed from the front bogie wheels.

Thus, on relatively hard ground or packed now, substantially no contact exists between the track adjacent the front bogie wheel and the ground surface. In soft snow, the difference in the elevation of the front and rear bogie wheels causes the snow to be packed harder at the rear bogie wheel than at the front bogie wheel, giving more weight support at the rear and producing the same effect as described above. Furthermore, in soft snow, the front skis are normally more effective.

An alternate track geometry which accomplishes the same objectives is schematically illustrated in FIG. 7. There, it will be seen, both front and rear bogie wheels 40 and 44 are normally maintained at a slight elevation above the ground level, so that the ground-contacting point is of limited area and located intermediate the wheels. The location of the contact point is not critical, it being significant only that the area of contact be limited and be located as far rearwardly as convenient to maximize the lever arm from the front ski. This can be accomplished by convexly contouring slide rail 48.

The improved rear track assembly described above not only improves the steering characteristics of the vehicle but has additional advantages as well. Since it is no longer necessary for the driver of the vehicle to violently shift his weight to effectively steer the vehicle, he may remain in the seated position. Furthermore, it is no longer necessary to artificially create a high center of gravity to assist in steering. Thus, the improved steering characteristics inherent in the vehicle enable the seat 12 and engine 14 to be lowered between the top of the widely spaced rear track assemblies 24. Thus, the above described vehicle is much safer to drive, since it has a lower center of gravity, wider stance, and since it enables the driver to remain in the lower and seated position.

By way of an example, a vehicle has been built and tested in accordance with this design with a length of approximately 86 inches, a width of 36 inches, and has been turned through a tight circle of only 8 foot diameter without the necessity of the driver having to lean or leave his seated position.

This invention may be further developed within the scope of the following claims. Accordingly, the above specification is to be interpreted as illustrative of only a single operative embodiment of this invention, rather than in a strictly limited sense.

I now claim:

1. In a small recreational snowmobile of the type characterized by a chassis, one or more steerable front skis, a power plant drivingly connected through a non-differential type power train to a pair of laterally spaced endless flexible track assemblies located rearwardly of the front skis, the lateral spacing between the track assemblies being sufficient to permit the power plant and driver seat to be located therebetween, the improved track assemblies each comprising:

a front bogie wheel and a rear bogie wheel, each rotatably mounted upon the respective opposite ends of a rigid longitudinal slide bar;

a driving wheel forming a portion of the power train and mounted on the chassis;

the endless flexible track engaging and encompassing said front and rear bogie wheels and said driving wheels to be guided and driven thereby;

said slide bar being positioned to be in sliding contact with the inner face of substantially the entire length of the lower portion of the endless track between said front and rear bogie wheels, said slide bar being contoured in a downwardly convex manner when viewed from the side of the snowmobile;

and rear suspension spring means mounted on the chassis and connected to said front and rear bogie wheels to bias said bogie wheels downwardly away from the chassis and toward the supporting ground surface, the geometry, dimensions and spring rate of said spring means and said track assemblies being selected to cause the normally and statically loaded snowmobile to be supported only by the front skis and a small ground-contacting portion of said tracks located at a point intermediate said front and rear bogie wheels and beneath the lowermost portion of said downwardly convex slide bar, when said snowmobile is on a relatively hard supporting ground surface, with said front and rear bogie wheels and the adjacent portions of said track being elevated above the supporting ground surface, whereas said intermediate portion of said track will support a greater portion of the weight of the snowmobile than will the adjacent portions of said track when the snowmobile is traversing loosely packed or soft terrain.

2. The snowmobile of claim 1 wherein the lateral spacing between said pair of rear track assemblies is sufficient to permit the power plant and driver's seat to be mounted between and at least partially below the levels of the tops of said rear track assemblies, thereby resulting in a low profile and low center of gravity snowmobile.

* * * * *